June 3, 1941.    C. A. MARIEN    2,244,166
PISTON
Filed April 4, 1938
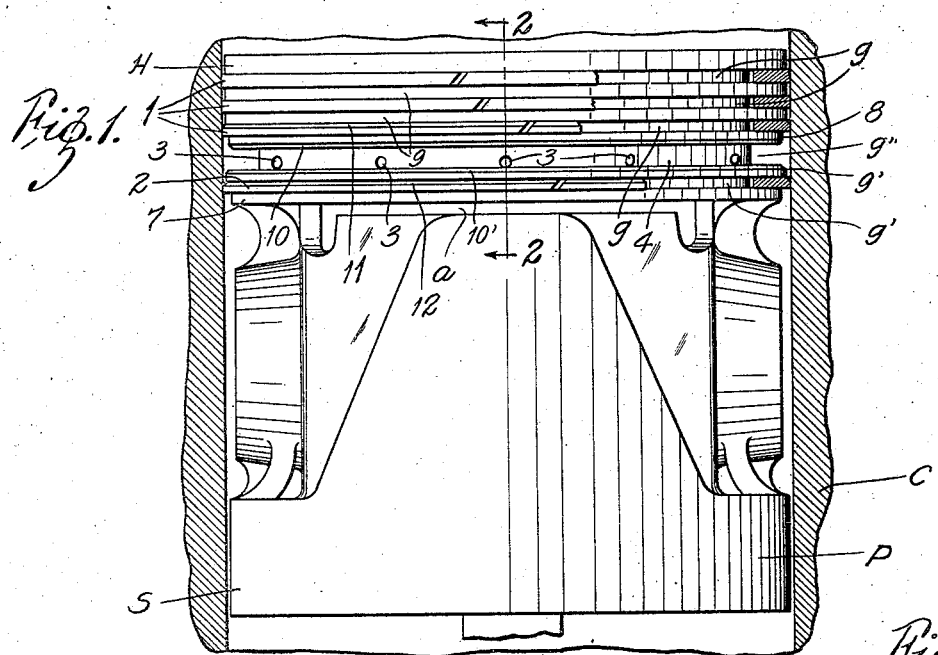
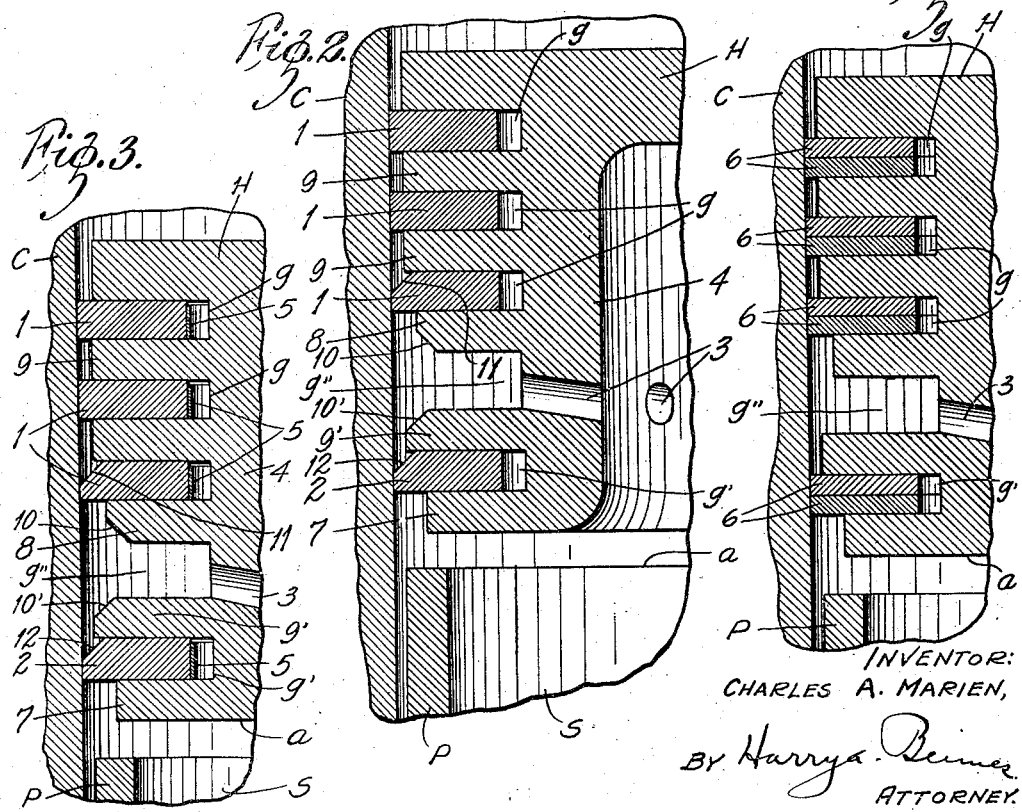
INVENTOR:
CHARLES A. MARIEN,
BY Harry A. Beimes
ATTORNEY.

Patented June 3, 1941

2,244,166

UNITED STATES PATENT OFFICE 2,244,166

PISTON

Charles A. Marien, St. Louis, Mo., assignor of one-fourth to Melvin W. Marien, St. Louis, Mo., and one-fourth to Harry A. Beimes, Webster Groves, Mo.

Application April 4, 1938, Serial No. 199,833

4 Claims. (Cl. 309—7)

My invention has relation to improvements in piston construction, and consists in the novel features more fully set forth in the specification and pointed out in the claims.

The invention relates more particularly to the head of the piston and the packing therefor whereby the piston is capable of operating under very high compressions and at the same time effectively controlling the oil within the cylinder.

The principal object of the invention is to simplify the packing means so as to eliminate expensively constructed piston rings which employ various devices for increasing the unit pressure and controlling the flow of oil. As is well known in the art the recent tendency in the design of internal combustion engines has been toward continually increased compressions and higher piston speeds. The piston rings that were available soon proved inadequate to hold the high compressions for which the engines were designed and to control the oil within the cylinder at the high operating speeds, so that piston ring manufacturers have been called upon continually to effect improvements in the piston rings in order that the engines might operate at the efficiency for which they were designed. Piston ring inventors have sought to accomplish the desired results by various expedients for increasing the unit pressure of the rings, and by introducing in the ring construction various oil scraper and oil drainage devices.

The ultimate result of this continual effort to evolve a piston ring that will perform effectively in a high speed high compression engine is the production of rings that are complicated, frail and expensive to manufacture. I have eliminated these difficulties by the simple expedient of increasing the number of piston rings in the piston head and providing an oil drainage groove in the piston head itself instead of in any of the rings. In my improved piston packing arrangement all of the rings are of plain construction embodying no special devices to operate as scrapers or oil passageways.

The advantages of the invention, together with the simplicity thereof, will be better apparent from a detailed description in connection with the accompanying drawing, in which:

Figure 1 is a side elevation of a piston and packing therefor, embodying the principles of my invention, the parts being broken away and fragments of the cylinder wall being shown in section. Fig. 2 is an enlarged vertical sectional detail through the piston head taken on the line 2—2 of Fig. 1. Figures 3 and 4 are modifications of the invention, the former embodying a spring inner ring or expander for the piston ring and the latter showing a plurality of rings in each piston groove.

Referring to the drawing, C indicates an engine cylinder in which a piston P operates, said piston being of the usual design, embodying a head H and a skirt S, separated by a transverse slot $a$. According to the most common present day practice all of the piston packing is located in the head of the piston. It is customary to have three piston ring grooves, in the two upper of which are disposed plain rings for holding the compression within the cylinder, while the lower ring is of different design and is known as an oil ring for the control of the oil flow within the cylinder. As stated above, great demands have been made on these rings through the increasing of the compression and piston speeds, and much trouble has been encountered in solving this problem.

I have discovered that a special oil ring may be dispensed with if the number of compression rings is increased and an oil drainage channel is disposed in the piston head between two of the rings. This arrangement is shown in Fig. 1 wherein a series of three plain thin rings 1, 1, 1 are disposed in grooves $g, g, g$, in the upper part of the piston head H, and a single plain ring 2 is disposed in a groove $g'$ in the lower part of the piston head adjacent to the slot $a$. The rings 1 and 2 are considerably thinner than those used in present practice and they are also spaced more closely together than is done under present practice, so that the sum total of the packing that is effective to hold the compression of the cylinder is greatly increased over that now in use.

The efficiency of the packing may be further controlled by regulating the tension of the rings so as to obtain any desired unit pressure within the limits of the material that is used. This material may be cast iron or spring steel, as desired; or, if preferred, some of the rings may be cast iron and others of spring steel.

The arrangement of the grooves $g$ and $g'$ is such that a relatively wide space is left between the bottom groove $g$ and groove $g'$, within which space is formed, or machined, a groove $g''$ of greater width than grooves $g, g'$ to serve as an oil reservoir for the excess oil within the cylinder. From the back of the reservoir $g''$ oil drainage ports 3 extend through the wall 4 of the piston head so that accumulations of oil within the groove $g''$ may drain therefrom into the cylinder C.

The unobstructed groove $g''$ provides greater reservoir space for surplus oil and permits of freer drainage back into the cylinder than can be obtained in the old practice of using oil rings. This must be obvious as the ring itself occupies some of the space of the groove while in the present case the entire groove space is utilized to receive and drain off oil. This free oil drainage also makes it practically impossible for carbon to accumulate in the groove and block the drainage therefrom.

In the modification shown in Fig. 3 the rings 1, 1, 1 and 2 are each backed up by a steel inner ring 5, or expander, which is located in the grooves g, g' behind the ring in a manner that is well understood in the art. By utilizing the expander 5 the unit pressure exerted by the rings against the cylinder wall may be very greatly increased.

In the modification shown in Fig. 4 a plurality of very thin rings (preferably steel) 6, 6 are disposed in the grooves g, g', each of which rings 6 will operate independently in the groove to maintain an effective seal against the cylinder wall, notwithstanding irregularities or unevenness of said cylinder wall. If desired, a single ring may be disposed in one or more of the grooves as shown in Fig. 2, while in other grooves a plurality of rings may be disposed such as shown in Fig. 4. In other words, the two forms illustrated in Figures 2 and 4 may be combined in one construction.

In order to facilitate the drainage of oil through the groove g'' and transverse slot a on the down stroke of the piston, the ring land 7 immediately above slot a and the ring land 8 immediately above groove g'' are slightly undercut, that is, of slightly smaller diameter than the other ring lands 9. Also ring lands 9 and 9' on the sides of groove g'' have their opposing edges 10, 10' respectively beveled to facilitate the entrance of excess oil into said groove g''. The upper edges 11 and 12 respectively of rings 1 and 2 adjacent to the groove g'' are also beveled so that excess oil may easily pass these rings on the up-stroke of the piston, after which the oil readily flows into groove g'' and slot a respectively.

The advantages of my improved piston and piston packing construction may be summed up as follows:

1. Simplicity, since all the rings are alike.
2. Durability, since the rings are of plain solid construction without intricate formations.
3. Efficient oil drainage because of the deep channel provided by the unobstructed oil groove.
4. Elimination of ledges and crevices for the accumulation of carbon.
5. Increased effectiveness of compression seal because of the greater number of rings than present day practice and higher individual unit pressure of each ring.

Having described my invention, I claim:

1. A piston having a head and a skirt with a transverse slot between said head and skirt, said head having a plurality of ring grooves in its periphery and an oil drainage groove disposed between two of said ring grooves, the upper bounding wall of the oil groove and the upper bounding wall of the transverse slot being of less diameter than the walls between ring grooves, the piston wall having oil drainage ports leading from the oil groove to within the piston, and the bounding walls of the oil grooves serving as ring lands.

2. A piston having a head and a skirt with a transverse slot between said head and skirt, said head having an open oil drainage groove in its periphery and a piston ring groove on each side thereof, a ring land between the oil drainage groove and each of the ring grooves, said ring lands having their opposite edges beveled, a ring in each of the ring grooves and the piston wall having oil drainage ports leading from the oil groove to within the piston, and the lower lands for said rings being of less diameter than the upper lands.

3. A piston having a head and a skirt, said head having an open oil drainage groove in its periphery and a piston ring groove on each side thereof of less width than the oil drainage groove, a ring land between the oil drainage groove and the ring grooves, the ring land between the oil groove and upper ring groove being of less diameter than that of the piston head in general, a ring in each of the ring grooves, and oil drainage ports leading from the oil groove to within the piston.

4. A piston having a head and a skirt, said head having an open oil drainage groove in its periphery and a piston ring groove on each side thereof of less width than the oil drainage groove, a ring land on each side of the piston ring grooves, the adjacent ring lands defining the extent of the oil drainage groove and having their outer edges beveled to form a widened passageway for oil into said groove, piston rings in the piston ring grooves, said piston rings having beveled faces extending between their outer peripheral surfaces and their upper surfaces, and the ring lands below the respective rings being of less diameter than the ring lands above said rings.

CHARLES A. MARIEN.